Oct. 5, 1965  G. T. R. CAMPBELL ETAL  3,209,720
VESSEL STERN GEAR SYSTEMS
Filed Nov. 29, 1963  8 Sheets-Sheet 1

INVENTORS
G.T.R. CAMPBELL
N.V. LASKEY

Fetherstonhaugh & Co.

ATTORNEYS

Oct. 5, 1965  G. T. R. CAMPBELL ETAL  3,209,720
VESSEL STERN GEAR SYSTEMS

Filed Nov. 29, 1963

INVENTORS
G.T.R. CAMPBELL
N.V. LASKEY

*Fetherstonhaugh & Co.*

ATTORNEYS

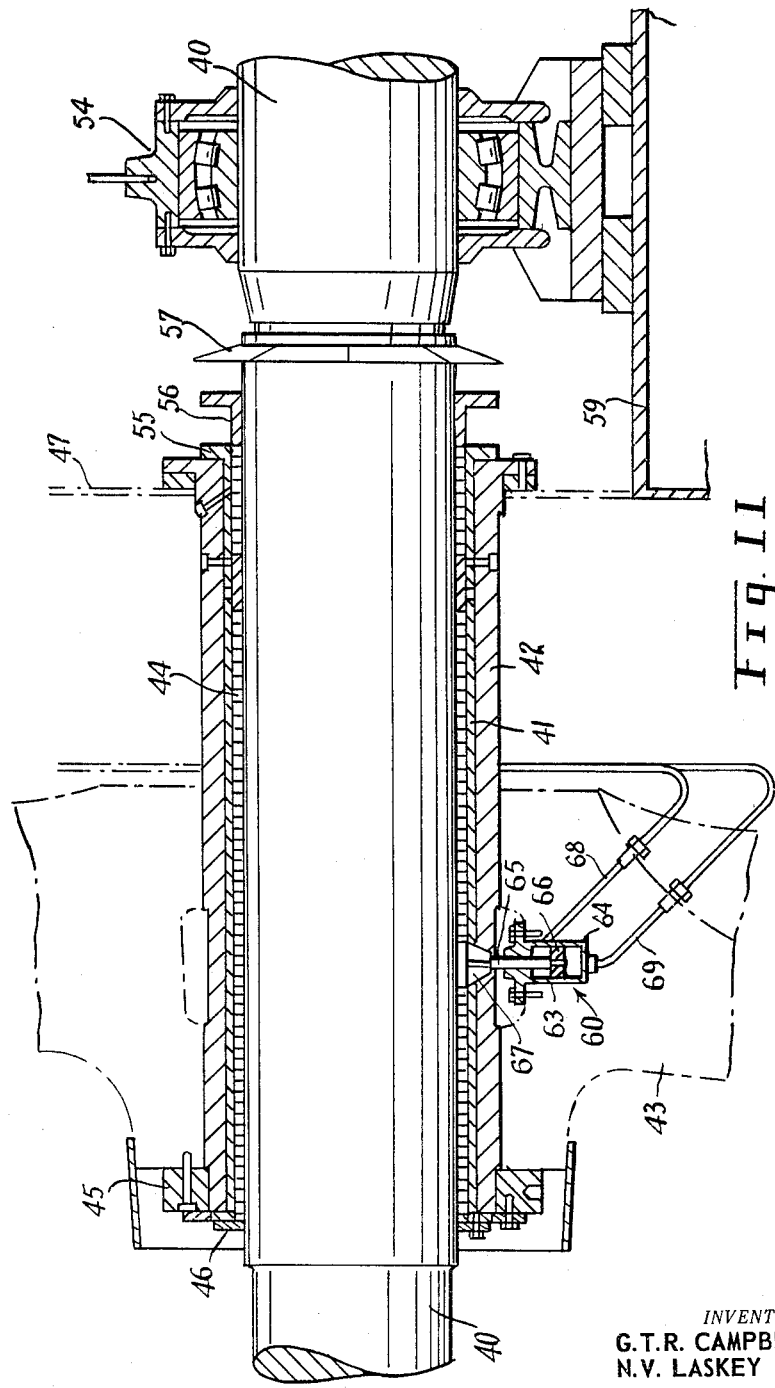

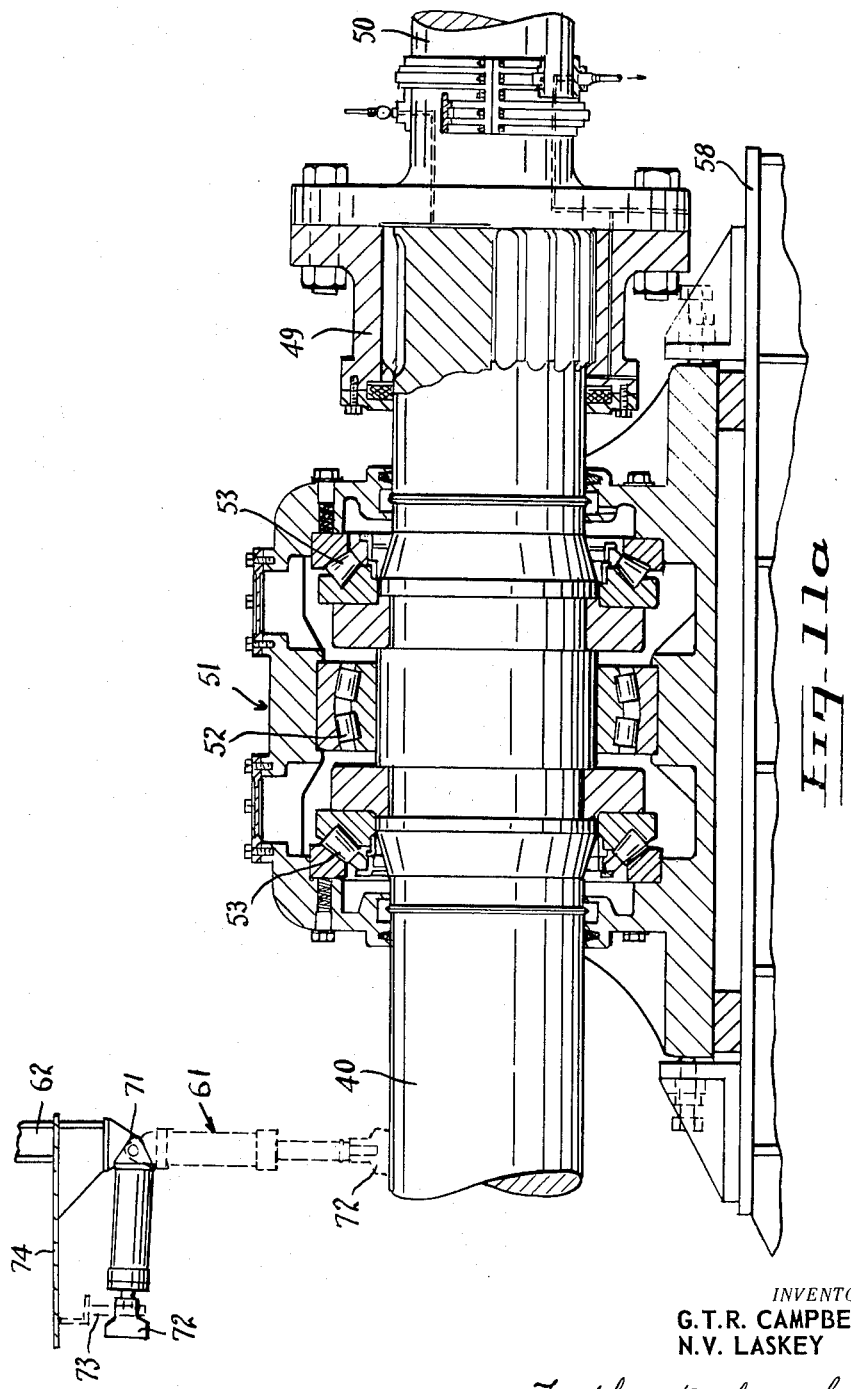

INVENTORS
G.T.R. CAMPBELL
N.V. LASKEY

*Fetherstonhaugh & Co.*
ATTORNEYS

Oct. 5, 1965   G. T. R. CAMPBELL ETAL   3,209,720
VESSEL STERN GEAR SYSTEMS
Filed Nov. 29, 1963   8 Sheets-Sheet 6

SHEAR FORCE DIAGRAM

BENDING MOMENT DIAGRAM

INVENTORS
G.T.R. CAMPBELL
N.V. LASKEY

Fetherstonhaugh & Co
ATTORNEYS

Oct. 5, 1965   G. T. R. CAMPBELL ETAL   3,209,720
VESSEL STERN GEAR SYSTEMS
Filed Nov. 29, 1963   8 Sheets-Sheet 7

INVENTORS
G.T.R. CAMPBELL
N.V. LASKEY

Fetherstonhaugh & Co.
ATTORNEYS

STRESS ANALYSIS OF TAIL SHAFT AT STEADY BEARING

I. DESIGN CONDITION

| | |
|---|---|
| BENDING MOMENT | 923,000 lbs ft |
| TORQUE | 967,000 lbs ft |
| SHEARING FORCE DUE TO BENDING | 162,220 lbs |
| END THRUST | 428,000 lbs |
| RADIUS OF SHAFT | 14.25 INS |
| MAXIMUM COMPRESSIVE STRESS BOTTOM OF SHAFT | 5,543 P.S.I. |
| MAXIMUM TENSILE STRESS TOP OF SHAFT | 4,197 P.S.I. |
| SHEAR STRESS AT TOP AND BOTTOM OF SHAFT | 2,550 P.S.I. |
| SHEAR STRESS AT SHAFT CENTRELINE | 333 P.S.I. |

TABLE OF RESULTS

| THEORY | MAXIMUM STRESS P.S.I. | | MAX<sup>m</sup> SHEAR STRESS P.S.I. | | EQUIVALENT TORQUE (lbs ft.) | | EQUIVALENT BENDING MOMENT (lbs ft.) | |
|---|---|---|---|---|---|---|---|---|
| | TOP OF SHAFT | BOTTOM OF SHAFT | TOP OF SHAFT | BOTTOM OF SHAFT | TOP OF SHAFT | BOTTOM OF SHAFT | TOP OF SHAFT | BOTTOM OF SHAFT |
| PRINCIPAL STRESS | 5,402 | 6,538 | 3,303 | 3,766 | 2,047,358 | 2,477,902 | 1,023,679 | 1,238,951 |
| MAXIMUM STRAIN | 5,750 | 6,840 | | | 2,151,250 | 2,592,360 | 1,075,625 | 1,296,180 |
| MAXIMUM SHEAR STRESS | | | 3,303 | 3,767 | 1,252,000 | 1,569,093 | | |
| MAX<sup>m</sup> ELASTIC STRAIN ENERGY | 5,708 | 6,685 | | | | | | |

II. WEAR DOWN CONDITION

| | |
|---|---|
| BENDING MOMENT | 1,321,585 lbs ft |
| TORQUE | 967,500 lbs ft |
| SHEARING FORCE DUE TO BENDING | 252,000 lbs |
| END THRUST | 428,000 lbs |
| RADIUS OF SHAFT | 14.25 INS |
| MAXIMUM COMPRESSIVE STRESS AT BOTTOM OF SHAFT | 7,623 P.S.I. |
| MAXIMUM TENSILE STRESS AT TOP OF SHAFT | 6,277 P.S.I. |
| SHEAR STRESS AT SHAFT CENTRE LINE | 528 P.S.I. |
| SHEAR STRESS AT TOP AND BOTTOM OF SHAFT | 2,550 P.S.I. |

TABLE OF RESULTS

| THEORY | MAXIMUM STRESS (P.S.I.) | | MAX<sup>m</sup> SHEAR STRESS (P.S.I.) | | EQUIVALENT TORQUE (lbs ft) | | EQUIVALENT BENDING MOMENT (lbs ft.) | |
|---|---|---|---|---|---|---|---|---|
| | TOP OF SHAFT | BOTTOM OF SHAFT | TOP OF SHAFT | BOTTOM OF SHAFT | TOP OF SHAFT | BOTTOM OF SHAFT | TOP OF SHAFT | BOTTOM OF SHAFT |
| PRINCIPAL STRESS | 7,183 | 8,532 | 4,045 | 4,721 | 2,722,357 | 3,233,628 | 1,361,179 | 1,616,814 |
| MAXIMUM STRAIN | 7,450 | 8,804 | | | 2,823,550 | 3,336,716 | 1,412,775 | 1,668,358 |
| MAX<sup>m</sup> SHEAR STRESS | | | 4,045 | 4,720 | | | | |
| MAX<sup>m</sup> ELASTIC STRAIN ENERGY | 7,675 | 8,810 | | | | | | |

Fig_17

INVENTORS
G.T.R. CAMPBELL
N.V. LASKEY

Featherstonhaugh & Co.
ATTORNEYS

United States Patent Office 3,209,720
Patented Oct. 5, 1965

3,209,720
VESSEL STERN GEAR SYSTEMS
George Thomas Richardson Campbell, Montreal, Quebec, and Norman Vernon Laskey, St. Lambert, Quebec, Canada, assignors to Algonquin Shipping and Trading Limited, Montreal, Quebec, Canada
Filed Nov. 29, 1963, Ser. No. 326,849
7 Claims. (Cl. 115—.5)

This invention relates to an improvement in marine propeller drive assemblies commonly known as vessel stern gear systems to provide longer bearing life and facilitate original installation and subsequent replacement. In the usual commercial vessel a high drive shaft horse-power must be converted having a low number of revolutions per minute. This has required use of larger propellers and heavier shafts which place excessive loads on the usual stern tube bearings and by reason of the nature of the construction heretofore used, undesirable and excessive strains are exerted on the shafting by heavy forces carried through to the driving gears with consequent damage. This is particularly the case with such vessels as icebreakers and is becoming an even greater problem with the advent of the super tanker and large bulk carriers where power outputs of the propulsive units vary between 15,000 and 25,000 shaft horse-power and the physical dimensions of modern propellers which are designed to absorb these high powers at low revolutions have reached proportions where the weight becomes prohibitive so much so that a propeller designed to absorb 20,250 s.h.p. at a speed of 110 r.p.m., weighs 30.7 tons even when totally immersed in sea water, while the tail shaft diameter is 26 inches. Marine engineers have therefore been faced with the difficult problem of providing a stern gear system which would return a reasonable life expectancy. The solution up to date has been confined to the extension of the age old practice of providing a stern tube lined with lignum vitae staves and suitably apportioning the length of the two bearing surfaces within the stern tube in order to limit the load on a basis of projected area of the bearing to about 48 lbs. per square inch. Moreover current installation practice provides no way of preloading the shafts and bearings to anticipate and provide by means of steady and thrust bearings for loads which will occur under actual operating conditions.

The running clearance of the lignum vitae lined bearing within the stern tube is usually apportioned on the basis of about $2.5/1000$ of an inch per inch diameter of the tail shaft where this dimension is that measured across a diameter on the outer periphery of the bronze liner which is shrunk on the shaft. The combination of necessary clearances with the overhung weight of the propeller produces completely uneven bearing loads and with the whirling action which occurs in the tail and intermediate shafts produces operating conditions which show that such a stern gear arrangement is completely unsatisfactory to such an extent that the entire arrangement is virtually wrecked within an operating period of six to eight months.

The pattern of failure is consistent—the lignum vitae staves in the after bearing of the stern tube are invariably found prematurely worn down below maximum tolerable limits and in some cases staves have been observed pushed partially out of the stern tube beyond the retaining ring at the after ends; in some cases the lignum vitae staves of the after bearing have been lost completely, being pushed out beyond the retaining ring and destroyed by the propeller with consequent displacement and distortion of the bronze retaining strips; similar conditions occur in the forward bearing but in this case the staves are pushed forward and heavy pressure is built up against the stuffing box connection of the stern gland; in some cases both the forward and after bronze bushes retaining the lignum vitae staves have been found slack although in certain of these cases the slackness appears only in the after bush which is installed in two pieces; another unusual phenomenon is the depositing on the inner periphery of the bronze bushes of deposits of a substance resembling carbon, which deposits coincide with the lateral abutments of the lignum vitae staves and increase in extent gradually in a forward direction on the surface of the after bronze bush; in the central annular spaces of the stern tubes in current use which provide for the introduction of cooling water, heavy cavitation, impingement and galvanic corrosion has occurred with serious consequences on the stern tube and on the tail shaft liner; fatigue bending cracks have occurred in the tail shaft in rear of the coupling connection to the intermediate shaft; in one known case a crack developed in the after peak bulkhead above the level of the stern gland; damage has been occasioned to the stern gland stuffing box which has required major repairs.

Frequent occurrences of these failures are not at all surprising, the reason being the excessive and unsatisfactory bearing reactions which occur and the failure to anticipate and provide for these in the bearings and other components of the drive system and the excessive length of shafting carrying longitudinal forces and reactions. A propeller overhanging from the tail shaft, of great weight even when immersed in salt water produces in this shaft a large tipping moment about a point in the lignum vitae bearing of the stern tube. The tail shaft being connected to a length of intermediate shafting by means of a solid bolted coupling in rear of the after pillow block bearing supporting the intermediate shaft, carries an upward tipping moment into the intermediate shaft which produces unprovided for strains in the intermediate shaft and in its bearings and connections which are incapable of sustaining such strains and consequently suffer damage resulting in early failure. The weight of the propeller normally produces a negative reaction between the phases of the solid coupling in excess of the positive reaction in the aftermost pillow block bearing produced by the weight component of the intermediate shaft and results in a very low negative reaction at this bearing. The displacement of the tail shaft permitted as a result of the necessary clearance in the various bearings, which of small extent, results in operating conditions at variance with the calculated conditions which produces strains and and other effects on the bearings and other components of the stern gear system which result in the effective destruction of the bearings and serious damage to other parts of the system in periods from six to eight months, which occasion heavy maintenance and repair expenses to the owners of the vessels. Another factor which produces excessive strains on the shafting is the fact that in the systems used to date the thrust bearing assemblies are at considerable distance from the propeller where the axial loading is imposed, with result that whirling action occurs in the shafting producing further undesirable strains and stresses in the entire system which further aggravates the wear on the system particularly in the tail shaft bearings and also causes damage to driving gears and housing. Moreover in the systems in current use there is no means of eliminating strains being imposed on the shafting by the normal working of the vessel structured during service.

As a means of combating the difficulties and undesirable operating conditions outlined above it has been suggested that a hollow tail shaft of larger diameter be substituted for the normal solid shaft and that a six bladed propeller instead of the common five bladed propeller, to be made of aluminum alloy to save weight, be substituted. Such systems are palliatives only and not cures for the fundamental problem in apportioning bearing reactions and absorbing the thrust and draw loads at a point away from the power source and close to the point of origin so that whirling action is avoided in the intermediate shafts and flexible couplings may be used to join the intermediate shaft to the tail shaft and also to the reduction gears. Further, the high cost of producing a hollow shaft of the proportions necessary, together with the expense of the aluminum alloy propeller, is hardly justifiable in view of the result being only an increase in the life of the bearings and not elimination of the real problem or cause of the damage.

Other partial solutions of the problem have been the installation of precision bearings in the stern tubes or the use of anti-friction white metal in place of the lignum vitae staves, in either case in conjunction with spring loaded rotating sealing rings to protect the precision bearings or retain the lubricating oils used with the white metal. At the inboard end of the standard stern tube, a stuffing box is provided to effect a seal against the ingress of salt water into the vessel. Where white metal is used in place of lignum vitae staves, rotating spring loaded sealing rings are used in lieu of the stuffing box but reliance solely on such sealing rings to protect the precision bearing or prevent ingress of salt water to the ship, is undesirable and is not accepted by ship-owners as satisfactory solution of the problem. In addition to the mechanical difficulties involved, the bending stress in the overhanging section of the tail shaft is further increased as the seal has to be accommodated between the after end of the stern tube and the hub of the propeller, which necessitates a longer overhanging section of the tail shaft.

The length of a stern tube is determined solely by the length of bearing surface it must accommodate in order to keep the unit loadings on the projected area within allowable limits, in the case of lignum vitae this is 48 p.s.i. As a rule this necessitates a ratio between stern tube lengths and shaft diameters varying between 7 to 1 and 9 to 1 and this ratio is seldom if ever reduced even when white metal lined bearings are used instead of lignum vitae. In connection with the length of the stern tube, the requirements of the regulatory bodies are such that provision has to be made to enclose the stern tube in a water-tight compartment formed at the stern and extending in a longitudinal direction between the boss of the stern frame casting and the transverse water tight after peak bulkhead. It is to be noted that whereas these regulatory bodies provide a specific requirement for the position of the collision or fore peak tank bulkhead on a sea-going vessel, no such specific requirement applies to the positioning of the after peak bulkhead as indicated by the following quotation from the American Bureau of Shipping—"Rules for Building and Classing Steel Vessels"—"After peak bulkheads are to be fitted in all screw vessels so arranged as to enclose the shaft tubes in a water tight compartment. They should extend to the strength deck or efficient partial bulkheads are to extend thereto." This means that a very short stern tube lined with lignum vitae staves could be employed provided the bearing load on such staves can be maintained at less than 48 p.s.i. This would mean that if a stuffing box could be combined with a very short stern tube and all contained in a water tight compartment formed by a transverse water tight bulkhead and horizontal and vertical water tight flats, that a steady bearing of the precision spherical roller type of high ratio load bearing capacity could be installed without any fear of contamination by sea water, much closer to the propeller than previously possible and thus alleviate to a large extent the radial loading to be carried on the lignum vitae bearing within the stern tube. Moreover the whirling action of the shaft could be greatly reduced or effectively eliminated by installing a spherical roller bearing centrally located between two taper roller thrust races installed within a common housing located on the tail shaft ahead of the steady bearing.

Under the practice currently followed in connection with the installation of shafting, the shafting can be accurately loacted in the bearings under static conditions but no valid information results as to the effective bearing loads which will occur or other stresses and forces which will be created under service conditions.

It is a principal feature of this invention to permit installation of the shafting so as to predetermine and provide at the outset for maximum bearing loads which will occur in service and to reduce bearing load on the stern tube bearing to a predetermined figure well below the allowable. It is a further purpose of the present invention to take advantage of the freedom to locate the rear after peak bulkhead and thus permit the use of a short stern tube combined with high load precision bearings. Another purpose is to provide for absorption of all thrust and draw forces in the stern gear system and thus permit a flexible connection between the tail and intermediate shaft as well as between the latter and the reduction gears so that introduction to the driving shafts of unknown strains caused by the working of the vessel structure in service may be avoided.

It is a further purpose of the present invention to provide a stern gear system to transmit the power from the source to the propeller of such form and method of construction, that not only is the life of the shaft and the stern tube and other bearings extended but the cost of the original installation and subsequent replacement of the system or any of its elements and accessories is greatly reduced. Other features of the invention will be apparent and best understood from the following description and the accompanying drawings in which:

FIGS. 11 and 11a are together the after and forward portions of a typical tail shaft and assembly of the present invention showing its accessories and the manner of connecting the tail shaft to the intermediate shaft;

FIG. 17 is the analyses and tables of stresses for the system of FIGS. 11 and 11a and shows that all are within allowable limits even under the worst service condition.

Figure 1:
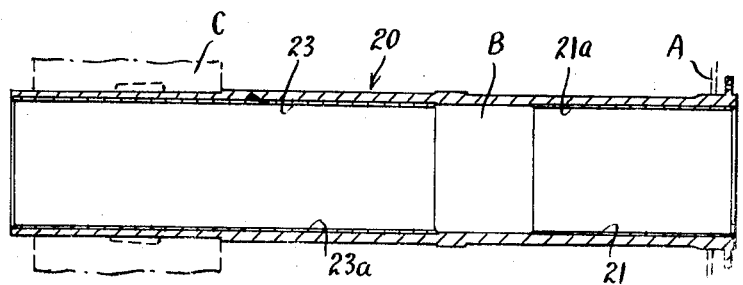
FIG. 1 is a typical design of a cast steel stern tube of the type presently in general use.

FIG. 1 shows the present form of a long stern tube 20 framed into the after peak tank bulkhead at A and through the stern post of the ship at C. The letter B indicates the location of the annular space required for the introduction of cooling water where heavy cavitation impingement and galvanic corrosion takes place requiring ultimate replacement of the stern tube 20. This annular space B which is required by reason of the length of the usual stern tube is eliminated in the stern tube of our invention as are the forward lignum vitae staves 21a forming the forward bearing 21. The space B and the forward bearing 21 are replaced by a stuffing box which is incorporated within the stern tube.

Figure 2:
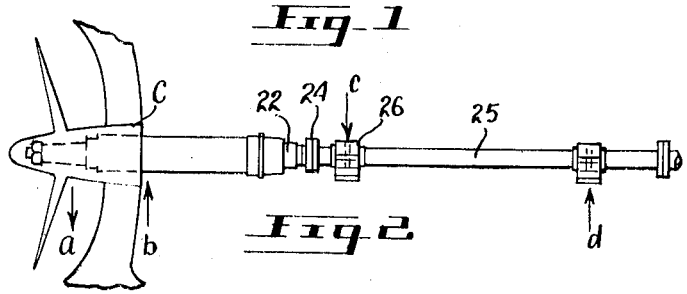
FIG. 2 is a typical design of a complete stern gear assembly in current use.
Figure 3:
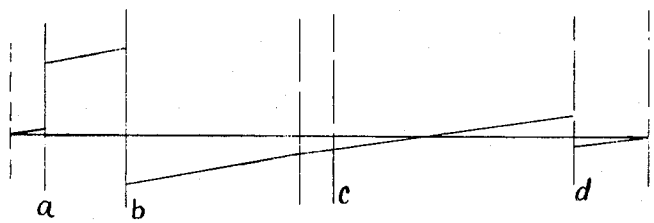
FIG. 3 is a shearing force diagram calculated on the basis of the bearing reactions computed for an assembly illustrated in FIG. 2.

FIGS. 2 and 3 indicate graphically how the tipping moment produced by the tail shaft 22 in the after bearing 23 of the stern tube produces a high upwards force at the coupling 24 which, reacting with the weight of the intermediate shaft 25 produces a very small load in the top bearing area of the rear pillow block bearing 26, the result being that the bearing calculations for the lignum vitae staves are completely erroneous and the load placed on the lower staves 23a of the after bearing 23 are greatly in excess of calculated loads while a similar but less intensive effect takes place on the upper staves 21a of the forward bearing 21.

Figure 13:
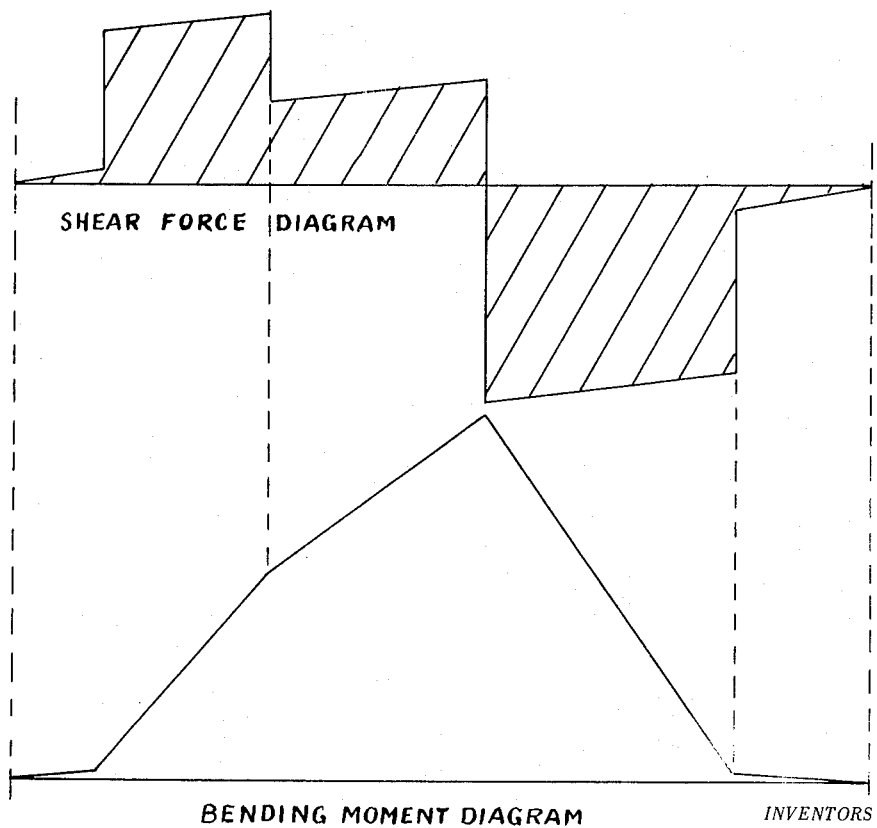
FIG. 13 is a bending moment and shearing force diagram for a tail shaft assembly of the invention computed for designed reactions in actual service with the sleeve bearing carrying its full proportion of load.
Figure 14:
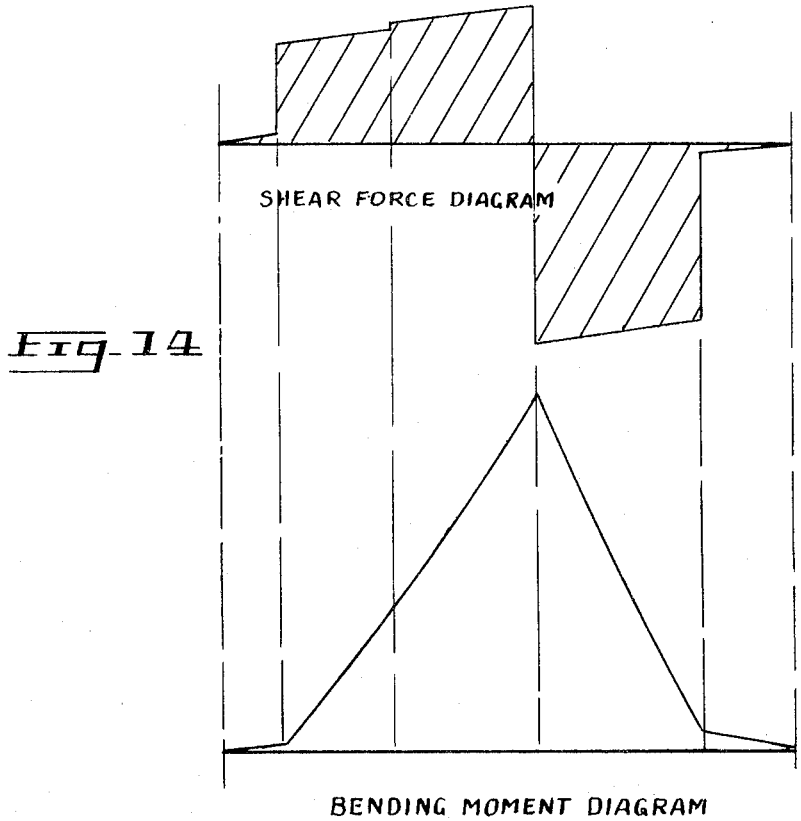
FIG. 14 is a corresponding bending moment and shearing force diagram assuming a condition of complete failure of the lignum vitae staves in the stern tube bearing.
Figure 15:
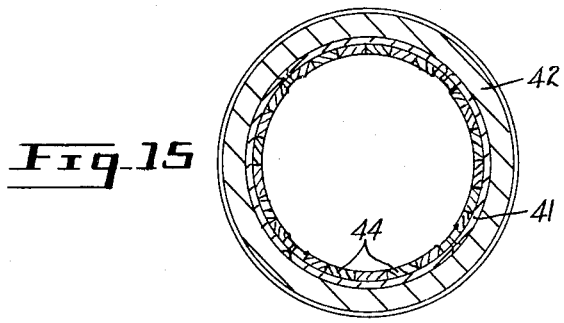
FIG. 15 is a cross-section through a typical stern tube bearing of the present invention showing the location and manner of retention of the lignum vitae staves.

FIG. 3 which is a typical shearing force diagram for stern gear systems in current use is for comparison with the similar diagrams of FIGS. 13 and 14 which show how, under the system of our invention, the shearing force change from positive to negative takes place at the precision bearing which is constructed to absorb this change instead of in the after lignum vitae bearing 23 which is not constructed for such purpose nor physically capable of enduring it.

We found that by shortening the stern tube and incorporating therein a stuffing box, that high load precision steady bearings may be used in close proximity of the stern tube so that the load to be carried by the stern tube bearing can be precisely predetermined and reduced far below the usual working load of 48 p.s.i. in fact to the vicinity of 20 p.s.i., thus greatly increasing the bearing life. It is also possible by means of our invention to provide steady bearings on the tail shaft which are capable of taking up the load which the stern tube bearing is designed to carry in event of failure of the latter so that the system may be continued in operation without risk of damage until an opportune moment arises to repair or replace the stern tube bearing. As the stuffing box is not affected by failure of the stern tube bearing it continues to serve its function. We have also found that with the system of our invention a high load thrust bearing may be incorporated with one or both of the precision bearings thus greatly reducing the shaft lengths carrying an axial compression load and thus diminishing whirling tendency with the consequent reduction of bearing and shaft wear, as well as in the fluctuating stresses created in the shafts by any such whirling action. Incorporation of the thrust bearings with the tail shaft bearings means that all thrust and draw forces are contained in the tail shaft assembly so that the tail shaft may be connected to the intermediate shaft by a flexible coupling such as a splined coupling. A similar connection may be used between the intermediate shaft and the reduction gears, thus eliminating incidence in the shafts of any strains or forces caused by working of the ship structure.

Figure 5:
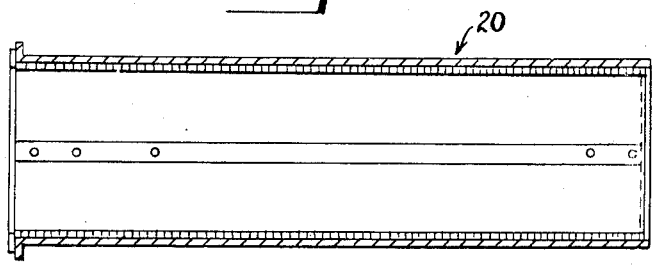
FIGS. 4 and 5 are respectively an end and longitudinal view of the lignum vitae staves in position in the after part of the usual two bearing stern tube.
Figure 4:
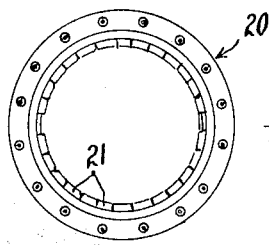

FIGS. 4 and 5 show the manner of placing and retaining the lignum vitae staves 21b of the stern tube bearing in current use which may also be employed in constructing the lignum vitae bearing used in our invention.

Figure 6:
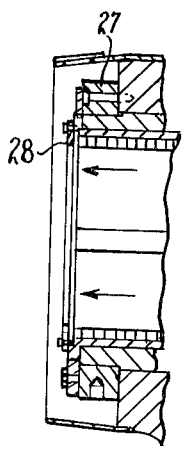
FIG. 6 is a detail of the outboard end of a typical stern tube.

FIG. 6 which is an enlarged detail of the propeller and of the stern tube is illustrative of how the unavoidable whirling action of the tail shaft of the standard stern gear system resulting from the excessive length aft of the thrust bearing and unavoidable excess loading of the lignum vitae bearings, destroys the lignum vitae bearing and also the stern tube nut 27 and lignum vitae retaining ring 28 at the propeller end of the stern tube 20. The lignum vitae staves 23a in the after bearing 23 of the stern tube are invariably found prematurely worn below maximum tolerable limit. In some cases the whirling action of the tail shaft causes the staves 23a to be pushed partially out of the stern tube, in the direction of the arrows in FIG. 6, beyond the retaining ring 28, damaging this ring in the process. This whirling is largely eliminated by the short tail shaft and shorter distance to the thrust bearings of our invention so that any corresponding reaction on the lignum vitae bearing is done away with, thus lengthening the bearing life.

Figure 7:
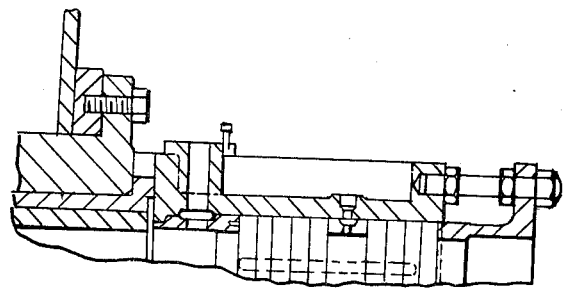
FIG. 7 is the inboard end of a typical stern tube in current use showing the connection with the stuffing box.
Figure 8:
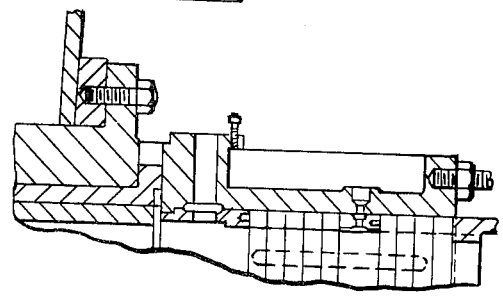
FIG. 8 is another detail of the connection between the stern tube and stuffing box.

FIGS. 7 and 8 illustrate where damage to the forward lignum vitae bearing 21 and to the stuffing box 29 of the presently used system occurs at the junction with the stern tube liner 30 and to the stuffing box itself, as the result of the axial movement induced in the lignum vitae staves by the whirling action taking place in the tail shaft 22 which are eliminated by the bearing system of our invention and the incorporation of the stuffing box within the stern tube.

In FIG. 7 axial loading of the lignum vitae staves 21a causes them to bear against the lantern ring 32 forming lines of compression in the staves. In FIG. 8 whirling of the tail shaft 22 causes frettage at the joint of the stuffing box 29 to bronze stern tube 20, and in the presence of salt water, causing frettage corrosion in the steel stuffing box.

Figure 9:
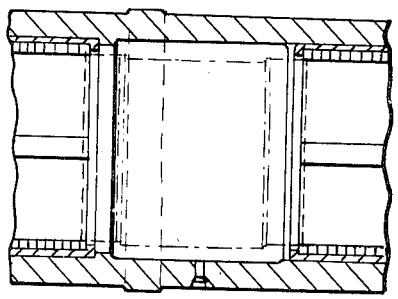
FIG. 9 is a detail of the central annular space where the cooling water is introduced in the type of stern tube currently in use.

FIG. 9 shows the annular cooling water space B where severe damage can be occasioned to the stern tube by cavitation, impingement and galvanic corrosion, which space is eliminated in our system and thus the source of damage to the stern tube is removed.

Figure 10:
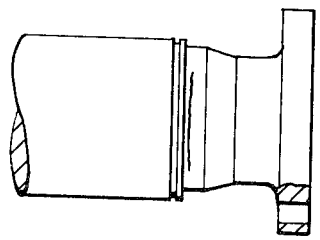
FIG. 10 is a detail showing where fatigue cracks may develop in the vicinity of the rigid bolted coupling between the tail and intermediate shafts of present systems.

FIG. 10 illustrates another failure point in the tail shaft 22 in which bending fatigue cracks 31 arises under service conditions with the present systems owing to the manner in which shear and other strains must be taken up and which is eliminated in our system as the strains are taken up in the high load precision bearings which are constructed for such purpose.

FIGS. 11 and 11a are a one thirty-sixth scale drawing of an actual embodiment of our invention with the appropriate shaft and bearings to carry the torsional, shearing and bearing thrusts, loads and stresses calculated for the worse service conditions such as would be created by a complete failure of the stern tube lignum vitae bearing.

Figure 12:
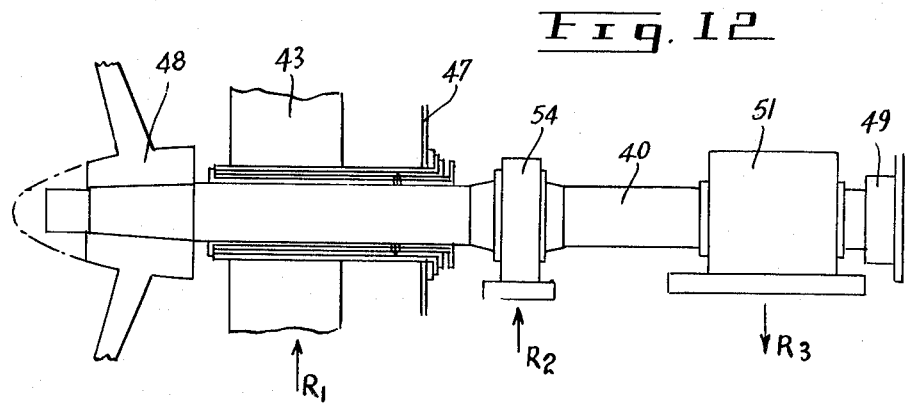
FIG. 12 is a reduced view of a complete tail shaft assembly of the present invention including the propeller and showing in section the stern tube part of this invention.

FIG. 12 shows the system or method of our invention as it would appear when installed.

Referring to FIGS. 11, 11a and 12 the tail shaft 40 is mounted in the stern tube 41 which is supported by the stern tube liner 42 in the stern frame 43. The stern tube 41 is provided with the lignum vitae staves 44 or can be provided with any other well known bearing material such as "cutless" strips or bearing metal. The stern tube 41 is relatively short and is secured in place at its outermost end by the stern tube nut 45 and the ends of the lignum vitae staves 44 are protected by the ring 46. The forward end of the stern tube 41 is secured against the watertight bulkhead 47.

The propeller 48 is secured on the outermost end of the tail shaft 40.

A splined coupling 49 is secured to the innermost end of the tail shaft 40 and forms a flexible coupling joining the tail shaft to the intermediate shaft 50.

A forward bearing 51 incorporating a spherical roller steady bearing 52 and thrust bearings 53 is mounted on the tail shaft 40 adjacent the coupling 49, while a rear steady bearing 54 is mounted on the tail shaft adjacent the innermost end of the stern tube 41.

A stuffing box 55 seals the innermost end of the stern tube 41 and is provided with the packing gland 56.

A water deflector ring 57 is mounted about the tail shaft 40 between the packing gland 56 and the rear steady bearing 54.

The bearings 51 and 54 are secured on their support structures 58 and 59 and are secured thereto after the tail shaft 40 has been preloaded as hereinafter described.

As indicated in FIGS. 13 and 14 which are shearing force and calculations bending moment diagrams for a typical system according to the present invention prior to installation. The reactions and loads must be determined for a proposed system by mathematical calculations taking into consideration the available locations for the bearings, the distance from propeller 48 to the point of connection of the tail shaft with the intermediate shaft 50, the size and weights of the shaft elements and the weight and maximum thrust of the propeller all of which are known from the physical characteristics of the components and the ship structure. Consequently the necessary preloading, supports and size of the steady and thrust bearings 51 and 54 may be determined in order that the various loads to be carried in service by them may be within their allowable limits and that the service load to be carried by the lignum vitae bearing 44 may be limited to a load which, distributed over the bearing, will result in unit loads in the neighborhood of twenty pounds per square inch.

In addition to the loads and reactions produced by the weight of the tail shaft 40 and propeller 48 which are taken up by the steady and thrust bearings 51 and 54 and the stern tube bearing 44, the thrust and draw forces and strains produced by the thrust or draw of the propeller 48 can be calculated from known mechanical formulae and the appropriate thrust bearings provided for. The thrust bearings 53 are preferably incorporated with the forward steady bearing 52 but may be located elsewhere on the tail shaft 40. As the entire thrust and draw loads are thus taken up within the tail shaft assembly, the tail shaft 40 may be connected to the intermediate shaft by a flexible coupling such as a splined coupling 49.

A splined coupling 49 will prevent the transfer to the tail shaft 40 via the intermediate shaft bearing of loads or strains resulting from hull structural working which is unavoidable in a ship. In current designs this transfer takes place because the intermediate shaft is rigidly connected to the tail shaft by a solid bolted flange type coupling, FIG. 2. Similarly the coupling attaching the intermediate shafting 50 to the output flange on the final wheel of a double reduction gear box may be a splined flexible coupling and thereby isolate the final wheel against the likelihood of the intermediate shafting transmitting extraneous loading due to hull structural deflections to the final wheel of the gear box and thereby cause malalignment of the secondary reduction gear train.

In order to provide for a condition of shaft equilibrium at the time of installation of the system of our invention and prior to the securing of the steady and thrust bearings 51 and 54 it is necessary to provide a method of preloading the tail shaft by means of an upward loading aft of the rear precision steady bearing 54 and of a bearing down loading on that part of the tail shaft 40 between the two precision steady bearings 51 and 54, such supporting and depressing loads are provided by the hydraulic jacks 60 and 61.

The hydraulic jack 60, in the form shown in FIG. 11, is built into the stern frame boss 43 directly below and on the vertical centreline passing through the axis of the tail shaft 40 to effect upward loading on the tail shaft.

The hydraulic jack 61 is pivotally mounted on the after peak bulkhead 62 and is located to effect downward loading on the tail shaft 40 at a point between the bearings 51 and 54.

The hydraulic jack 60 is formed by an open ended cylinder 63 located in a bore 64 in the stern frame boss 43 and a piston rod 65 is secured to the piston 66 at one end and to a concave plate 67 at the opposite end. The stern tube linear 42, stern tube 41 and lignum vitae staves 44 are bored out on the axis of the piston rod 65 to permit the concave plate 67 to make direct contact with the surface of the tail shaft 40. Appropriate hydraulic lines 68 and 69 are connected to the cylinder of the jack 60 from a hand pump 70.

The hydraulic jack 61 is pivotally mounted at 71 to a rigid structure at the after peak bulkhead 62 directly above and on the vertical centreline passing through the axis of the tail shaft 40. The jack 61 is also provided with a concave plate 72 adapted to make surface contact with the tail shaft 40 when the jack is in the vertical position shown in dotted lines in FIG. 11a. Provision is made to hold the jack 61 in a horizontal position by engaging the head of the jack with a hook 73 suspended from the watertight flat 74. Appropriate hydraulic lines 75 and 76 connect the jack 61 with the hand pump 77.

Such preloading and its accessory system are an essential part of our invention.

By providing appropriate forwardly diminishing tail shaft diameters, unitary bearing races, which are preferable to split races, may be used in the bearings 51 and 54, as unitary races may be threaded on the tail shaft 40 from the forward end and located over the bearing stools 58 and 59 after the shaft 40 has been placed in the stern tube bearing but before it is coupled to the intermediate shafts before preloading of the tail shaft.

In accomplishing our invention the various components of the system are designed and fabricated from the calculations predicted on the features of the particular vessel in which the system is to be installed. The stern tube 41 including the lignum vitae bearing 44, and the stuffing box 55 are placed in position in the vessel together with the hydraulic jacks 60 and 61 and their fluid system. The tail shaft 40 is then inserted from inboard into the stern tube 41 and temporarily supported in any suitable manner appropriate to the circumstances, to maintain appropriate alignment. The roller races of the steady and thrust bearings 51 and 54 may now be threaded on the tail shaft and the bearing housings are completely assembled but left disconnected from the bearing stools 58 and 59. The propeller 48 is then fitted to the tail shaft and the propeller nut tightened up temporarily. The hydraulic jacks 60 and 61 operating independently and concurrently are then pumped to adequate pressures by the pumps 70 and 77 to effect the calculated preloading to attain the required equilibrium of the shaft. The bearings 51 and 54 are now accurately chocked down on their stools 58 and 59 so that, when the pressures imposed by the jacks are removed, the bearing reactions will in fact be in accordance with the design. The tail shaft 40 may then be connected up to the intermediate shaft 50 through the splined coupling 49 which has previously been threaded over the inboard end of the tail shaft. After the stuffing box 55 has been tightened up to the required pressure and lubrication of the stern gear system attended to, the system is in condition to operate.

Prior to placing the tail shaft 40 and stern tube 41 in place, an appropriate water tight compartment must be constructed to form part of the vessel structure to the forward bulkhead 47 to which the stern tube may be bolted so that it is properly enclosed in compliance with the requirements of the regulatory authorities.

Figure 16:
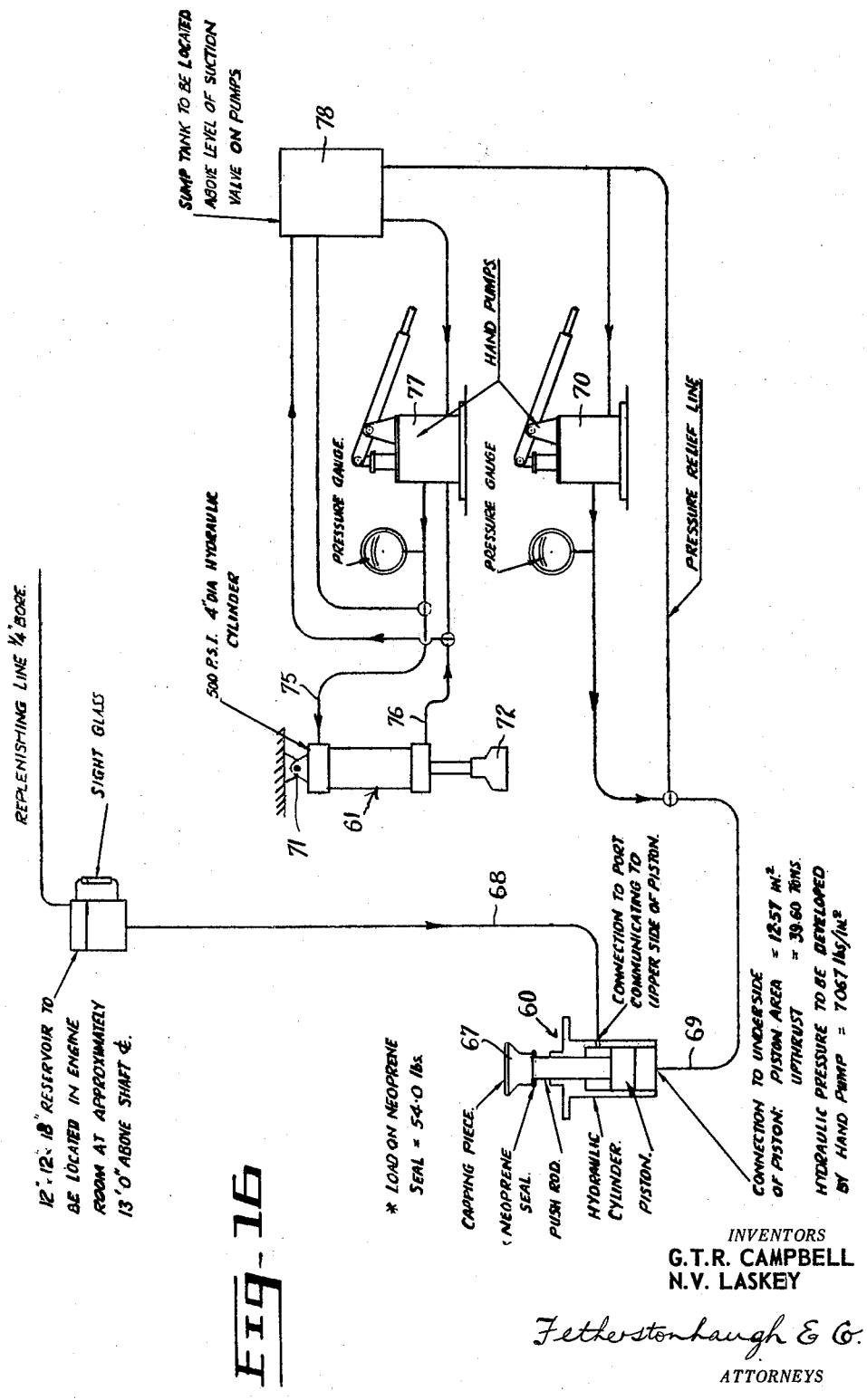
FIG. 16 is a diagram of a hydraulic system to operate the jacks used in installing the tail shaft and providing for preloading of the tail shaft and bearings in accordance with the principles of this invention.

A suitable installation for the operation of the hydraulic jacks 60 and 61 using hand pumps 70 and 77 is illustrated in FIG. 16 and includes a sump tank 78 from which appropriate lines lead to the hand pumps and jacks.

It will, of course, be understood that the hand pumps 70 and 77 may be replaced by power pumps.

In FIG. 17 a detailed stress analysis based on the theories of principal stress, maximum strain, maximum shear stress and maximum elastic strain energy for "as fitted" and completely "worn down" conditions are tabulated for an installation using the present invention. It will be observed that the stresses which obtain are of a low order of magnitude.

The calculated deflection for unit loads and unit moment in the tail shaft for the "as fitted" static condition owing to the weight of the propeller alone, measured at a location coinciding with the longitudinal position of the centre of gravity of the propeller on the tail shaft is $5.2 \times 10^{-6}$ cm. This calculation is based on the assumption that point support occurs in the stern tube bearing at a distance equal to one half of the length of this bearing, measured from the after end. The deflection caused by the dynamical bending moment induced by the five-bladed propeller is calculated to be $3.0 \times 10^{-8}$ cm.

In the "worn down" condition, the static and dynamic deflections are based on the assumption that point support accrues at the centre of the after spherical roller bearing 54, amounts to $3.06 \times 10^{-5}$ cm. and $8.49 \times 10^{-8}$ cm. respectively.

It will be apparent to anyone skilled in the art that in lieu of the jack at the after peak bulkhead a tension device might be used and that similarly if circumstances required it a tension device might be attached to the exterior of the vessel above the propeller to produce the load required at that end of the tail shaft.

It will also be understood that various modifications and changes may be made in the embodiments of invention illustrated and described herein to conform to special circumstances without departing from the scope of the invention as defined by the following claims.

It will also be apparent that by the variation in location, of the thrust bearing or installation of additional steady bearings, or the use of other materials for the stern tube bearing, that installation methods and the nature of applying temporary loading forces to position the tail shaft before final adjustment of the steady and thrust bearings may be varied by anyone skilled in the art without departing from the scope of the invention as defined in the claims hereof.

What we claim is:

1. A marine tail shaft preloading system for incorporation in or with vessel structures in contactable spaced relation to the tail shaft of the propulsive system of the vessel which, by applying supporting and depressing forces to the tail shaft during installation, will produce a state of equilibrium in the tail shaft which will be equivalent to that required to be produced in service by the tail shaft and tail shaft bearings so as to permit mathematical calculation of service loads and stresses and the design of the appropriate shaft and bearings and subsequent installation thereof in the vessel in such manner and under known conditions so as to ensure maintenance at all times of shaft stresses and bearing loads within designed limits, comprising adjustable bearing and load imposing components, one located in the point of extrusion of the tail shaft and another located towards the interior of the vessel, means for applying controlling and releasing force to the said load bearing and load imposing components, and adjustable steady and thrust bearings supporting the said tail shaft in its preloaded condition after withdrawal of the said bearing and load imposing components from the tail shaft.

2. A marine tail shaft preloading sytem for incorporation in or with vessel stern frame and after peak bulkhead structures in contactable spaced relation to the tail shaft of the propulsive system of the vessel which, by applying supporting and depressing forces to the tail shaft during installation, will produce a state of equilibrium in the tail shaft which will be equivalent to that required to be produced in service by the tail shaft and tail shaft bearings so as to permit mathematical calculation of service loads and stresses and the design of the appropriate shaft and bearings and subsequent installation thereof in the vessel in such manner and under known condition so as to ensure maintenance at all times of shaft stresses and bearing loads within designed limits, comprising adjustable bearing and load imposing components, the said load carrying component being located in the vessel stern frame and the load imposing component being secured to the after peak bulkhead structure, and means for applying, controlling and releasing force to such load bearing and load imposing components.

3. A marine tail shaft preloading system for incorporation in or with vessel stern frame and after peak bulkhead structures in contactable spaced relation to the tail shaft of the propulsive system of the vessel which, by applying supporting and depressive forces to the tail shaft during installation, will produce a state of equilibrium in the tail shaft which will be equivalent to that required to be produced in service by the tail shaft and tail shaft bearings so as to permit mathematical calculation of service loads and stresses and the design of the appropriate shaft and bearings and subsequent installation thereof in the vessel in such manner and under known conditions so as to ensure maintenance at all times of shaft stresses and bearing loads within designed limits, comprising a stern tube bearing located in the stern frame of the vessel, adjustable bearing and load imposing components, the said load carrying component being located in the stern frame of the vessel and passing through the said stern tube bearing to make direct contact with the said tail shaft and the said load imposing component being secured to the after peak bulkhead structure, and means for applying controlling and releasing force to such load bearing and load imposing components.

4. A self-supporting and self-contained marine stern gear system for transmitting driving force from a power source in the interior of the vessel to an exterior propeller comprising a stern frame, a watertight housing, a sleeve bearing within the said watertight housing and supported in the said stern frame, a shaft in said sleeve bearing projecting in one direction beyond the said watertight housing and in the other direction beyond the said stern frame, steady and thrust bearings associated with the said shaft inwardly of the said watertight housing, the said sleeve bearing and steady and thrust bearings adapted to support predetermined parts of the static and service loads on the said shaft, a first hydraulic jack located in the said stern frame below said sleeve bearing and projecting through said sleeve bearing to make direct contact with the said shaft, a second hydraulic jack mounted exteriorly of the said watertight housing above the said shaft and in contact therewith, the said first hydraulic jack adapted to apply a predetermined upward loading on the said shaft and the said second hydraulic jack adapted to apply a predetermined downward loading on the said shaft, and means to adjust the said steady and thrust bearings to take over the loads on the said shaft imposed by said first and second hydraulic jacks.

5. A self-supporting and self-contained marine stern gear system as defined in claim 4 in which the said shaft is withdrawable rearwardly from the said steady and thrust bearings and sleeve bearing, and the forward end of the said shaft is provided with a removable splined coupling.

6. A marine tail shaft preloading system as defined in claim 2 in which the preloaded tail shaft is supported in its preloaded alignment by bearings and the preloaded components are withdrawn from contact with the tail shaft.

7. A marine tail shaft preloading system as defined in claim 2 in which the load bearing and load imposing components are hydraulic jacks.

References Cited by the Examiner

UNITED STATES PATENTS

| | | | |
|---|---|---|---|
| 796,810 | 8/05 | Clarkson | 115—34 |
| 2,010,965 | 8/35 | Scrivener | 308—26 X |
| 2,404,921 | 7/46 | Oxsen | 308—59 |
| 2,521,368 | 9/50 | Hingerty | 115—34 |
| 2,869,936 | 1/59 | Federn | 308—15 |

MILTON BUCHLER, *Primary Examiner.*

ANDREW H. FARRELL, *Examiner.*